(12) United States Patent
Beckett et al.

(10) Patent No.: US 7,651,721 B2
(45) Date of Patent: *Jan. 26, 2010

(54) MILK CHOCOLATE CONTAINING WATER

(75) Inventors: Stephen Thomas Beckett, York (GB); Daniel Hugelshofer, Konolfingen (CH); Junkuan Wang, Lonay (CH); Erich Josef Windhab, Hemishofen (CH)

(73) Assignee: Nestec S.A., Vevey (CH)

( * ) Notice: Subject to any disclaimer, the term of this patent is extended or adjusted under 35 U.S.C. 154(b) by 421 days.

This patent is subject to a terminal disclaimer.

(21) Appl. No.: 11/461,995

(22) Filed: Aug. 2, 2006

(65) Prior Publication Data

US 2008/0187629 A1 Aug. 7, 2008

Related U.S. Application Data

(63) Continuation of application No. 10/318,305, filed on Dec. 13, 2002, now Pat. No. 7,186,435, which is a continuation of application No. PCT/EP01/04767, filed on Apr. 26, 2001.

(30) Foreign Application Priority Data

Jun. 14, 2000 (GB) .................. 0014570.6

(51) Int. Cl.
*A23G 1/00* (2006.01)
*A23G 9/00* (2006.01)
*A23P 1/08* (2006.01)

(52) U.S. Cl. .................. 426/631; 426/93; 426/101; 426/302

(58) Field of Classification Search ......... 426/601–602, 426/101, 93, 302–304, 631
See application file for complete search history.

(56) References Cited

U.S. PATENT DOCUMENTS

| 3,218,174 | A | 11/1965 | Schubiger et al. |
| 5,004,623 | A | 4/1991 | Giddey et al. |
| 5,080,923 | A | 1/1992 | Martin, Jr. et al. |
| 5,120,566 | A | 6/1992 | Baba et al. |
| 5,126,160 | A | 6/1992 | Giddey et al. |
| 5,149,560 | A | 9/1992 | Kealey et al. |
| 5,425,957 | A | 6/1995 | Gaim-Marsoner et al. |
| 5,460,847 | A | 10/1995 | Kawabata et al. |
| 5,468,509 | A | 11/1995 | Schlup et al. |
| 5,527,556 | A | 6/1996 | Frippiat et al. |
| 5,626,900 | A | 5/1997 | Miller |
| 5,958,503 | A | 9/1999 | Dumoulin et al. |
| 5,965,179 | A | 10/1999 | Ducret et al. |
| 6,165,540 | A | 12/2000 | Traitler et al. |
| 6,174,555 | B1 * | 1/2001 | Leas et al. .................. 426/100 |
| 6,261,627 | B1 | 7/2001 | Armstrong et al. |
| 6,391,356 | B1 | 5/2002 | Willcocks et al. |
| 7,186,435 | B2 * | 3/2007 | Beckett et al. .............. 426/631 |

FOREIGN PATENT DOCUMENTS

| EP | 0401427 | 12/1990 |
| EP | 0442324 | 8/1991 |
| EP | 0832567 | 4/1998 |
| EP | 0933029 | 8/1999 |
| EP | 940085 | 9/1999 |
| EP | 0958747 | 11/1999 |
| FR | 2169842 | 9/1973 |
| GB | 1364500 | 11/2006 |
| JP | 60027339 | 2/1985 |
| JP | 03-091443 | 4/1991 |
| JP | 09-135663 | 5/1997 |
| JP | 09-248132 | 9/1997 |
| SU | 1718773 | 3/1992 |
| WO | WO9306744 | 4/1993 |
| WO | WO9740700 | 4/1993 |
| WO | WO 98/30818 | 7/1998 |
| WO | WO9904435 | 9/1999 |

OTHER PUBLICATIONS

Beckett, S. T., "Industrial Chocolate Manufacture and Use," Blackwell Science, vol. 3, Chapters 15, 17, 18 and 23 (1999).

* cited by examiner

*Primary Examiner*—Carolyn A Paden
(74) *Attorney, Agent, or Firm*—K&L Gates LLP

(57) ABSTRACT

A process for manufacturing milk chocolate products containing a higher than normal water content by preparing a dark chocolate containing up to 30% by weight of water, adding a milk powder suspension optionally together with seed crystals of cocoa butter or cocoa butter equivalent, and mixing under low shear. The invention also relates to high water content milk chocolate products, methods of preparing a chocolate coated ice cream article with such products and to the resulting chocolate coated ice cream articles.

8 Claims, No Drawings

MILK CHOCOLATE CONTAINING WATER

PRIORITY CLAIM

This application is a continuation of U.S. patent application Ser. No. 10/318,305 filed on Dec. 13, 2002, now U.S. Pat. No. 7,186,435 which is a continuation of PCT/EP01/04767 filed Apr. 26, 2001, the entire disclosures of which are hereby incorporated.

FIELD

The present invention relates to milk chocolate products containing water and more particularly to a process for manufacturing milk chocolate products containing a higher than normal water content.

BACKGROUND

Conventional chocolate production and processing methods avoid contact with water since small amounts of added water cause severe rheological changes in the product, usually accompanied by lumping and/or granulation leading to a coarse unacceptable eating texture (Minifie, B. W. Chocolate, Cocoa and Confectionery—Science and Technology, 3 edition, Chapman & Hall (1989)). On the contrary, addition of larger quantities of water, usually in the form of fresh cream or full cream milk, results in the production of "ganache" which is conventionally used as a short shelf-life filling for truffles or as a topping for confections. Ganache is the confectioner's term for a phase-inverted (i.e., oil-in-water) chocolate preparation that has a softer eating texture than normal chocolate and that does not have the snap of traditional chocolate when broken.

European patent application 832,567 describes a process for the preparation of chocolate or the like that has a high water content. The water is in a dispersed phase in the form of micro-droplets in a continuous fatty phase that contains crystallized sugars. A mass of chocolate is carefully mixed into an emulsified water-in-oil base, so that destruction of the water-in-oil structure of the emulsion is substantially avoided. Contact between the sweetened components and the non-fatty solids of cocoa on the one hand and the dispersed aqueous phase on the other is responsible for the formation of agglomerates. This results in the ability of the chocolate to be converted by conventional manufacturing processes. It has been found that, when a milk chocolate with a high water content is produced by this process, a ganache is obtained whose softer texture and poor contraction makes it unsuitable for conventional chocolate manufacturing processes such as molding, because the product does not contract sufficiently so that it can be removed from the mold.

European patent application 958,747 overcomes the above problem by adding a sucrose syrup and discloses a method for the preparation of a water-in-oil phase chocolate formulation. The method comprises the step of admixing a concentrated sugar syrup to a chocolate fat phase that has a fat content of at least 25% w/w under conditions of low shear at a temperature of from 30° C. to 55° C. wherein the viscosity of the sugar syrup is in the range of from 500 cps to 140,000 cps measured at 20° C. and the sugar syrup has a solids content of at least 70% w/w. The final moisture content of the chocolate formulation is in the range of from 2% to 20% w/w and the fat content usually ranges from 28% to about 45% w/w.

This process only works, however, if there is no crystallization of sugar in the sugar syrup phase of the formulation during preparation. Also, this sugar syrup is added to the chocolate fat phase and not to the chocolate itself. This means that, in the case of dark chocolate, the sugar is added as the syrup to a mixture of cocoa butter and cocoa liquor, i.e., not to chocolate. In traditional chocolate making, a conching process is used to obtain the correct flavor in the final product (Beckett, S. T. Industrial Chocolate Manufacture and Use, $3^{rd}$ Edition, Chapter 9, Blackwell Science, 1999). This process could not be used in this case, as the need for a slow speed mixer is emphasized, whereas a conch is a higher shear device. It also has been found that the application of higher speed mixing to all types of water containing chocolate results in a ganache type of product which, as noted above, cannot be successfully be removed from a mold.

In the preparation of milk chocolate, European patent application 958,747 adds the syrup to milk chocolate ingredients that have a lower sugar content. If a normal sugar content were present (i.e., one that is usually above 45%), the addition of further sugar through the syrup would result in a product that has a sugar content that is outside of the recognized legislative limits for chocolate (See Beckett, S. T. Industrial Chocolate Manufacture and Use, $3^{rd}$ Edition, Chapters 18 and 23, Blackwell Science, 1999). In addition, if sucrose or glucose like sugars were used in the syrup the product would be too sweet. Also this illustrates that once again the syrup is being added to unconched ingredients.

The levels of sugar used in the examples of European patent application 958,747 are in fact more typical of those used in ice-cream chocolate and that patent application states that the eating texture is very complementary with ice-cream chocolate. Ice-cream coatings, however, have a different texture to traditional chocolate tablets (Beckett, S. T. The Science of Chocolate, Royal Society Of Chemistry, 2000). It should be noted that the milk solids levels quoted in the example of European patent application 958,747 are below the level necessary to give the milk chocolate its traditional taste and texture, and that the water contents are lower than for the dark chocolate.

U.S. Pat. No. 5,468,509 describes a milk chocolate containing 1-16% water in which the chocolate preparation is produced by mixing cocoa butter with cocoa ingredients in the presence of an edible emulsifier so that the ingredients are thoroughly coated with cocoa butter. This mixture is then blended with an aqueous phase prepared separately by mixing water, sweetener and milk solids to give a uniform mixture without resulting in high viscosity, followed by tempering at 27-32° C. in the absence of a conching step. It has been found that conching turns the mixture into a ganache that cannot be molded satisfactorily because it does not contract sufficiently to be removed from the mold. As was the case with European patent application 958,747, this absence of a conching stage will result in a chocolate that has a much different taste than traditional chocolate (Beckett, S. T. Industrial Chocolate Manufacture and Use, $3^{rd}$ Edition, Chapter 9, Blackwell Science, 1999). Furthermore, it has also been found that conching a water containing dark chocolate would result in a product that does not retain the taste of a fully processed dark chocolate.

European patent application 401,427 describes a cream-containing chocolate which contains about 1.8 to 10% of moisture content and not less than 3% of milk fat content. A water-in-oil type emulsion consisting of a cream which has not less than 30% of milk fat content is used in this product. Also, a lipophilic emulsifier is mixed in a chocolate base material which may be a dark, milk or white chocolate, by kneading. The chocolate product can contract from a mold because the fat, which contracts when changing from liquid to solid on cooling, is the continuous phase. No non-fat milk solids are present in the water-in-oil type emulsion even when a milk or white chocolate is to be prepared. This means that it can not legally be called milk chocolate, nor can it have the taste and texture of a typical milk chocolate tablet.

Although not wishing to be bound by this theory, it is believed that if the required amount of milk solids were present in the water-in-oil type emulsion, the hydrophilic proteins present in milk solids would attract water and destroy the emulsion structure. Water and hydrophilic particles would then become the second continuous phase when the emulsion is mixed with the chocolate base material i.e., the result would be a product that is similar to a ganache and one that would not be capable of contracting in the mold for removal. This is because water does not significantly contract, because unlike fat it does not solidify during the cooling process.

Furthermore, many products are now sold to provide the consumers with added benefits to their health e.g., added vitamins or calcium. Some of these are soluble only in fats, while others are soluble only in water. As conventional chocolate has a relatively low water content, it is not possible to successfully add water soluble additives to chocolate.

Attempts to add an emulsion to normal milk chocolate result in ganache unless the mixing would be carried out at extremely low rates, which would make it commercially unviable. In addition, it has been found that milk chocolates made under these extremely low shear/mixing rates become white due to bloom within 24 hours.

Accordingly, none of the above processes are completely satisfactory, e.g., they are either not cost-effective, the eating texture of the resultant chocolate product is not considered by the consumer to be typical of a milk chocolate bar at ambient temperatures, or the chocolate cannot be readily be removed from a mold, thus limiting its use in confectionery products. The present invention now remedies these problems.

SUMMARY

A process for manufacturing milk chocolate containing a higher than normal water content has now been developed. This process is cost-effective, and the chocolate has excellent organoleptic properties and can easily be demolded. In addition, a chocolate having a low fat and low calorie content can be easily obtained from this method.

The present invention now demonstrates how water can successfully be added to a traditionally produced dark chocolate. This process comprises preparing a dark chocolate containing up to 30% by weight of water, combining a milk powder suspension with the dark chocolate to form a mixture, and mixing the mixture under low shear to form the milk chocolate product. The low shear mixing can be easily carried out by pumping the mixture through a static mixer.

Advantageously, the suspension of milk powder may be an oil or fat suspension. By adding the milk solids in a slurry form to a dark chocolate that already contains water, a milk chocolate product containing a higher than normal water content can be manufactured. This process is made more robust, in that it can tolerate a higher mixing rate than would be possible if an emulsion were added to normal milk chocolate.

When tempering of the milk chocolate product is required, seed crystals of cocoa butter or a cocoa butter equivalent may be added together with the oil or fat suspension of milk powder to the dark chocolate. In addition, milk chocolate products produced according to the present invention using a milk slurry and cocoa butter seed at the rate of several kilograms per hour have remained bloom free for up to six months or longer.

Without excluding its use in ice-cream, the milk chocolate products of the present invention has a texture similar to a traditional tablet chocolate at ambient temperatures. In developing the current invention it was discovered that the presence of non-fat milk solids destabilized water containing milk solids when their level approached that which is required by legislation (Beckett, S. T. Industrial Chocolate Manufacture and Use, 3rd Edition, Chapter 23, Blackwell Science, 1999), but milk solids are also required to give the milk chocolate its traditional taste and texture. The current invention works optimally at higher moisture levels, e.g. about 10%-15%, and can employ the required levels of milk solids.

When a low fat, low calorie chocolate product is desired, the fat content of the product can be lowered by simply substituting non-hygroscopic or emulsifier treated non-fat solids for a portion of the milk powder suspension.

The invention also relates to the milk chocolate products that are disclosed herein and that are preferably produced by the present processes.

Yet another embodiment of the invention is a method of preparing a chocolate coated ice cream article which comprises preparing or utilizing a milk chocolate product as disclosed herein and coating an ice cream with the milk chocolate product.

DETAILED DESCRIPTION

The milk chocolate produced by the process of the present invention may have a water content from 1.5 to 25%, preferably from 5 to 20%, more preferably from 7.5 to 17.5%, and especially from 10 to 15% by weight based on the weight of the milk chocolate.

The dark chocolate containing from 1 to 30% by weight of water may be prepared by any known method. In this case, the dark chocolate material, which can be a traditional conched dark chocolate or a compound containing vegetable fat, etc., is advantageously added to a water-in-oil emulsion using light mixing. The mixing must be sufficient to disperse the water throughout, but not so strong as to form a continuous phase. The water may then be in the form of individual droplets as suggested by European patent application 832,567, or in the form of sucrose solution droplets as suggested by the present invention, or may be formed using methods such as the those described in European patent application 958,747.

In the case of using an emulsion, the water content of the water-in-oil emulsion may conveniently be from 10 to 80% by weight and preferably from 40 to 70% by weight. The oil in the water-in-oil emulsion may be cocoa butter or a cocoa butter substitute which generally is a vegetable fat capable of being used to replace cocoa butter in chocolate and couvertures and well known to those skilled in the art. The emulsifier in the water-in-oil emulsion may be, for example, lecithin, a polyglycerol ester of a fatty acid such as polyglycerol polyricinoleate (PGPR) or diacetyl tartaric acid esters of monoglycerides or any mixture of two or more emulsifiers. The size of the droplets of the emulsion is preferably below 10 microns. The amount of emulsifier may be from 0.5 to 3% by weight and preferably from 0.75 to 2% by weight based on the weight of the water-in-oil emulsion.

The dark chocolate material may comprise the usual ingredients, i.e., cocoa liquor, cocoa butter and sugar together with an emulsifier, or it may be a chocolate analogue well known to those skilled in the art. It should be understood that the term chocolate is employed in this description to designate chocolate and its analogues. Thus, all or part of the cocoa butter may be replaced by a fat of vegetable origin or a mixture of fats of vegetable origin currently used in confectionery of which the physico-chemical properties are similar to or equivalent to those of cocoa butter. In addition, sugar may be replaced partially or completely by a substitute such as a low calorie sweetening agent, e.g. an alcohol such as sorbitol, mannitol, isomalt, maltitol, xylitol, erythritol and galactitol.

In one example, the dark chocolate material may be prepared by conventional methods including a conching step. The dark chocolate material is added in molten form to the emulsified water-in-oil base, e.g., at a temperature from 32° C. to 50° C., preferably from 33° C. to 35° C., with stirring at low speed, e.g., 50 to 150 rpm for a shear stress from 20 to 100 Pa. for a period of from 1 to 10 minutes, preferably from 2 to 5 minutes. The emulsified water-in-oil base may be mixed with the dark chocolate material in a ratio of emulsified water-in-oil base to dark chocolate material so as to give a water content of the required percentage. This is likely to be within the range of from 1:20 to 1.1. The incorporation of the dark chocolate material into the emulsified water-in-oil base may be carried out batchwise or continuously. The dark chocolate produced by mixing the dark chocolate material with the emulsified water-in-oil base preferably contains from 2 to 25% by weight of water, more preferably from 5 to 20% by weight of water.

The oil or fat suspension of anhydrous milk powder preferably contains an emulsifier such as lecithin, a citric acid ester, diacetyl tartaric acid esters of mono- and di-glycerides (DATEM) or polyglyceryl polyricinoleate (PGPR) in an amount of from 0.1 to 1% by weight, and may be added to the dark chocolate containing from 1 to 30% water either before or together with seed crystals of cocoa butter or cocoa butter substitute and mixed under low shear, e.g. 50 to 150 rpm for a shear stress from 20 to 100 Pa. When the milk powder suspension is added before the seed crystals of cocoa butter or cocoa butter substitute, the mixing may be carried out at a low rotational speed, e.g., 50 to 150 rpm for a shear stress from 20 to 100 Pa. for a period of from 1 to 10 minutes, preferably from 2 to 5 minutes, at a temperature within the range from 35° C. to 50° C., after which time the mixture was cooled to a temperature from 30° C. to 34° C. and the seed crystals added and the stirring continued until crystallization occurred, e.g., for a period of from 1 to 15 minutes. When the milk powder suspension is added to the dark chocolate containing from 1 to 30% water together with seed crystals of cocoa butter or cocoa butter substitute, the mixing may be carried out in a static mixer, e.g., by pumping the mixture through the static mixer, at a temperature from 25° C. to 38° C., conveniently from 30° C. to 34° C. for cocoa butter, after which the mass may be directly molded.

Preferably the milk powder suspension may be prepared by mixing the appropriate amounts of non-fat milk solids, milk fat, and an emulsifier to provide a slurry which is added together with the seed crystals of cocoa butter or cocoa butter substitute to the water-containing conched dark chocolate.

The amount of the milk powder suspension added to the dark chocolate containing from 1 to 30% water may be an amount sufficient to provide the quantity of milk solids (including milk fat) normally present in milk chocolate-like products, e.g., from 10 to 30% by weight, preferably from 15 to 25% by weight based on the total weight of the milk chocolate.

If desired, the fat content of the milk powder suspension may be lowered by adding other non-fat solids, e.g., non-fat cocoa solids. Preferably these should be non-hygroscopic or should be coated with an emulsifier to reduce their hygroscopy, e.g., cocoa powder and lecithin. This is then mixed with the milk powder suspension and the dark chocolate containing from 1 to 30% water. The amount of non-fat solids, e.g., non-hygroscopic non-fat solids, added may be from 0.5% to 60%.

As is well known, it is unnecessary to temper chocolate that is to be used for coating ice cream. However, it is customary and essential to temper chocolate that is consumed at ambient temperatures. Standard tempering machines use high shear rates, and in fact this is regarded as beneficial (Beckett, S. T. Industrial Chocolate Manufacture and Use, $3^{rd}$ edition, pages 236-238, Blackwell Science). However, such high shear rates would ordinarily change a water containing chocolate into ganache. It has now been found that tempering may be achieved by an alternative method of adding seed crystals in the form of solid fat is therefore preferable as high shear rates are no longer required. The seed crystals can be in the form of cocoa butter alone, or the fat seeds may be within solid chocolate or cocoa liquor or cocoa powder pieces.

The amount of seed crystals of cocoa butter or cocoa butter substitute may be from 1 to 20% by weight and preferably from 5 to 15% by weight based on the weight of the milk powder suspension.

The milk chocolate produced by this invention has excellent eating quality and can easily be demolded. In addition, a low fat and calorie content can be achieved because of the presence of higher than normal amounts of water.

The present invention therefore also provides a milk chocolate containing higher than normal amounts of water and less than normal proportions of fat and sugar.

The amount of water in the milk chocolate may be from 1.5 to 25%, preferably from 5 to 20%, more preferably from 7.5 to 17.5%, and especially from 10 to 15% by weight based on the weight of the milk chocolate. The amount of fat may be less than 27%, preferably less than 25% and especially from 24 to 20% fat by weight based on the weight of the milk chocolate. The amount of sugar may be less than 40%, preferably less than 37.5% and especially from 30 to 35% sugar by weight based on the weight of the milk chocolate.

Water has zero calories and is therefore a good component of low calorie food. Many of the other ingredients in common usage, e.g., sugar alcohols as sugar replacers, not only have a significant calorific contribution themselves, but also have a restricted consumption owing to their laxative effect.

The milk chocolate containing higher than normal amounts of water according to the present invention may be used as a coating for ice cream in which case, since tempering is unnecessary for an ice cream coating, the addition of the seed crystals of cocoa butter or cocoa butter equivalent to the dark chocolate is unnecessary.

As noted above, certain added ingredients such as vitamins or calcium are soluble only in water or only in fat. For example, vitamin A is only soluble in fat while vitamin C is only soluble in water. The water-containing chocolate products of the invention contain both water and fat-soluble components in the same product, so that both fat-soluble and water-soluble vitamins can be present, therefore providing a more beneficial overall effect.

EXAMPLES

The following Examples further illustrate the present invention. Parts and percentages are indicated by weight.

Example 1

40 parts water, 39 parts cocoa butter and 1 part polyglycerol polyricinoleate are mixed for 3 minutes at 33° C. using a rotor-stator device rotating at 130 rpm to give 80 parts of an water-in-oil emulsion having a droplet size below 10 microns. 320 parts of a dark chocolate prepared by conventional methods including a conching step is melted and added at 33° C. to the water-in-oil emulsion in the anchor stirrer and stirred for a further 3 minutes to produce a dark chocolate containing 10% water.

85 parts of a fat suspension of milk powder are prepared by mixing 58 parts non-fat milk powder, 13.5 parts milk fat, 13 parts of cocoa butter and 0.5 parts lecithin is added together with 8 parts of grated dark chocolate. This milk powder suspension is added to the 400 parts of the above dark chocolate containing 10% water and stirred for 2 minutes at 130 rpm at 31° C. to give a milk chocolate containing 8% water and 23% fat. The milk chocolate is charged to a mold followed by cooling from which it was removed easily to provide the molded product.

The milk chocolate produced has excellent eating quality and texture and, in addition to the higher than normal water content, can easily be demolded as well as having a low fat and calorie content. It can also incorporate both fat and water soluble beneficial components.

Example 2

0.3 parts of polyglycerol polyricinoleate are mixed with 9.2 parts of cocoa butter and stirred with a rotor-stator device at 100 rpm for one minute at 40° C. 13.5 parts of water at ° C. are added and the mixture is further stirred for 2 minutes. The emulsion droplets are finely dispersed by increasing the speed of the rotor-stator device to 5000 rpm for 2 minutes to give 23 parts of emulsion. 8 parts of non-fat milk powder, 2.5 parts of milk fat, 2.4 parts of cocoa butter and 0.1 parts of citric acid ester of monoglycerides are mixed at 35° C. to give 13 parts of suspension. 40 parts of dark chocolate prepared by conventional methods including a conching step is melted and mixed at 32° C. with 23 parts of the emulsion in a static mixer to give water-containing dark chocolate. 13 parts of the fat suspension of milk powder prepared as above and 2 parts of cocoa butter seed are continuously added to the product flowing in a pipe and mixed in a second static mixer, whereupon the water containing milk chocolate can be molded directly.

Once again the chocolate which contains 17% water was demolded and had a hardness associated with conventional chocolate.

The invention is claimed as follows:

1. A chocolate product comprising from 5% to 25% by weight of water, fat in an amount less than 27% by weight, 30% to 40% by weight of sugar, dark chocolate, and 10% to 30% by weight of an oil or fat suspension of milk powder, and having a texture similar to that of conventional bar chocolate at room temperature.

2. A low fat chocolate coated ice cream comprising an ice cream and the chocolate product of claim 1.

3. A method of preparing a low fat chocolate coated ice cream article which comprises coating an ice cream with the chocolate product of claim 1.

4. The chocolate product of claim 1, comprising 5% to 25% by weight of water, less than 25% by weight of fat, and 15% to 25% by weight of oil or fat suspension of milk powder.

5. The chocolate product of claim 1, comprising 10% to 20% by weight of water, from 20% to 24% by weight of fat, 51% to 67% by weight of dark chocolate, and 15% to 25% by weight of oil or fat suspension milk powder.

6. A method of preparing a chocolate coated ice cream article, the method comprising:
    preparing a dark chocolate containing up to 30% by weight of water,
    adding an oil or fat suspension of milk powder to the dark chocolate to form a mixture,
    mixing the mixture under low shear to form a milk chocolate product having a water content from 5% to 25% by weight and fat in an amount less than 27% by weight and having a texture similar to that of conventional bar chocolate at room temperature, and
    coating an ice cream with the milk chocolate product.

7. A method for manufacturing a milk chocolate product, the method comprising:
    preparing a dark chocolate containing up to 30% by weight of water,
    adding an oil or fat suspension of milk powder to the dark chocolate to form a mixture, and
    mixing the mixture under low shear to form the milk chocolate product having a water content from 5% to 25% by weight and fat in an amount less than 27% by weight and having a texture similar to that of conventional bar chocolate at room temperature, wherein the fat content of the oil or fat suspension of milk powder is lowered by substituting non-hygroscopic or emulsifier treated non-fat solids for a portion of the oil or fat suspension of milk powder and wherein from 0.5% to 60% by weight of the non-fat solids are added to the oil or fat suspension of milk powder, based on the weight of the suspension.

8. A method for manufacturing a milk chocolate product, the method comprising:
    preparing a dark chocolate containing up to 30% by weight of water,
    adding an oil or fat suspension of milk powder to the dark chocolate to form a mixture, and
    mixing the mixture under low shear to form the milk chocolate product having a water content from 5% to 25% by weight and fat in an amount less than 27% by weight and having a texture similar to that of conventional bar chocolate at room temperature, wherein the low shear mixing is carried out by pumping the mixture through a static mixer.

* * * * *